(12) United States Patent
Brennan

(10) Patent No.: US 6,276,080 B1
(45) Date of Patent: Aug. 21, 2001

(54) AUTO EMERGENCY WARNING MARKER

(75) Inventor: Joseph P. Brennan, Northbrook, IL (US)

(73) Assignee: Satellite Manufacturing Company, Niles, IL (US)

( * ) Notice: Subject to any disclaimer, the term of this patent is extended or adjusted under 35 U.S.C. 154(b) by 0 days.

(21) Appl. No.: 09/323,980

(22) Filed: Jun. 1, 1999

(51) Int. Cl.[7] ............................................. G09F 21/04
(52) U.S. Cl. ......................... 40/591; 40/903; 116/63 T; 248/208
(58) Field of Search .................... 40/591, 610, 612, 40/617, 903; 116/63 T; 248/208

(56) References Cited

U.S. PATENT DOCUMENTS

| | | | |
|---|---|---|---|
| 2,856,814 | * 10/1958 | Dillmann | 248/208 X |
| 3,670,438 | 6/1972 | Carroll et al. | |
| 3,672,323 | 6/1972 | Hawes. | |
| 3,703,152 | 11/1972 | Morton | 40/903 X |
| 3,738,039 | 6/1973 | DeFuria. | |
| 3,762,360 | 10/1973 | Hawes. | |
| 3,934,541 | 1/1976 | May et al. | 116/63 T |
| 3,975,849 | 8/1976 | Tuleja | 40/612 X |
| 4,348,978 | 9/1982 | Brucato. | |
| 4,754,565 | * 7/1988 | Cox | 40/643 X |
| 4,805,550 | * 2/1989 | Raczkowski et al. | 116/63 T |
| 5,031,347 | * 7/1991 | Berg | 40/539 X |
| 5,048,451 | * 9/1991 | Reimers et al. | 40/602 X |
| 5,062,380 | 11/1991 | Chestnut. | |
| 5,084,994 | 2/1992 | Elmer | 40/591 |
| 5,195,264 | 3/1993 | Johanson et al. | 40/591 |
| 5,692,331 | * 12/1997 | Tipke | 40/591 |
| 5,755,411 | * 5/1998 | Strong, III et al. | 248/208 X |

* cited by examiner

Primary Examiner—Brian K. Green
(74) Attorney, Agent, or Firm—Shughart Thomson & Kilroy P.C.

(57) ABSTRACT

An improved auto emergency warning marker, designed to be hung on an automobile side window, is made of molded plastic and includes a reflective base member and two reflective side members which fold to a compact storage configuration when not in use, but which interlock to make a highly visible triangle. Integrally molded with the base member are a hook positioned proximate one end of the base member, which hook curves outward away from the base member to fit over the top of an automobile side window which has been cranked partially open and a pad holder with attached resilient pad positioned near the center of the base member which contacts the window exterior to support the marker thereon. The improved warning marker will remain solidly anchored on an automobile side window, once positioned there, even in the face of gusting wind conditions.

5 Claims, 2 Drawing Sheets

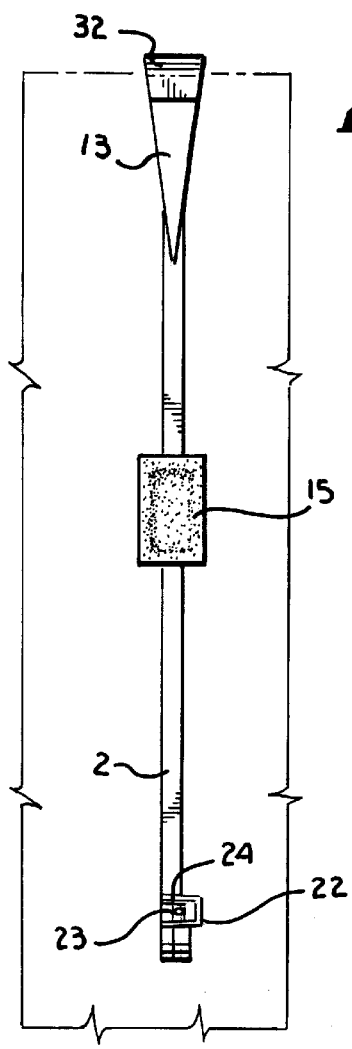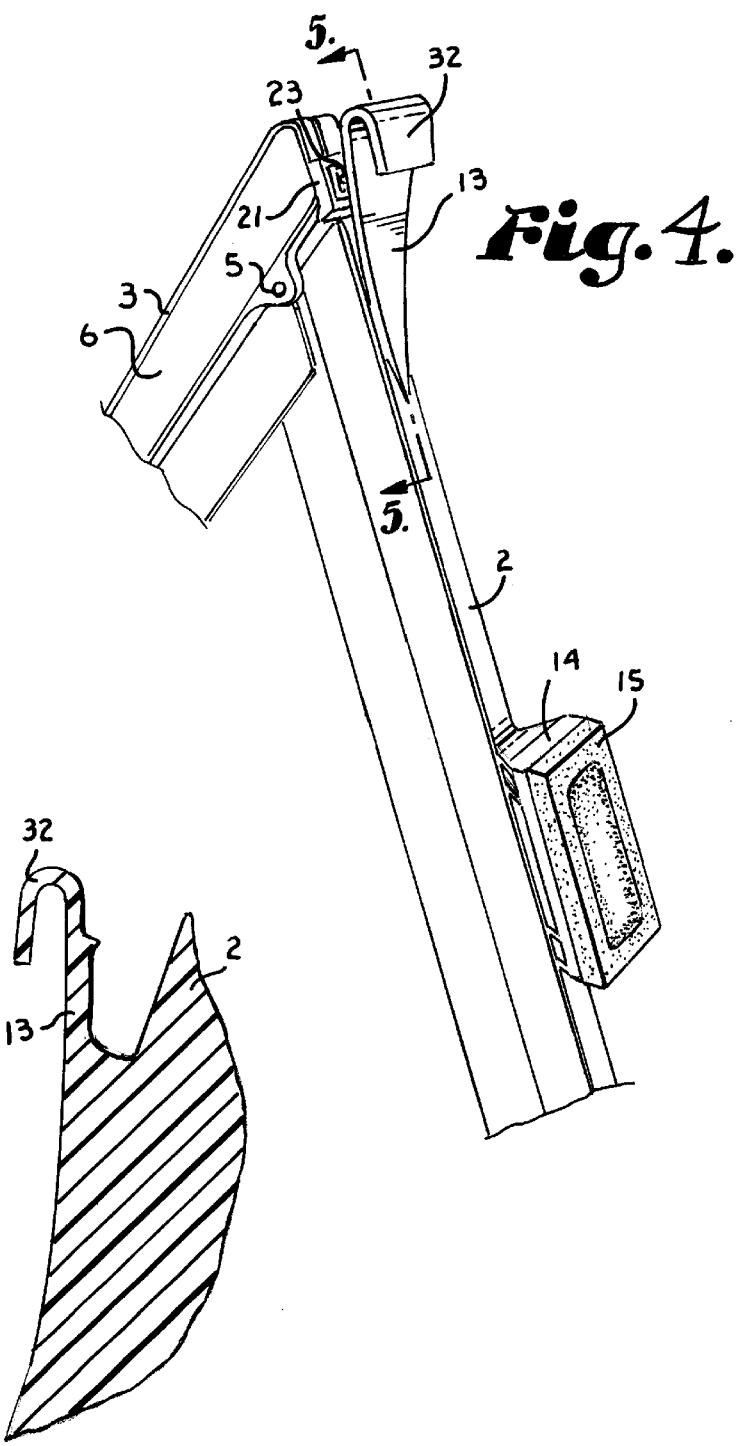

AUTO EMERGENCY WARNING MARKER

FIELD OF THE INVENTION

The present invention relates to an improved auto emergency warning marker, and, more particularly, to such an emergency marker which is collapsible for compact storage, and includes an integral hook and pad holder which enables the marker to be hung on an automobile side window to provide an effective, readily visible warning sign for motorists in distress.

BACKGROUND OF THE INVENTION

There have been a number of designs of highly visible, reflective warning signs for use by motorists to attract help in the event of car trouble or other problems. One example is shown in U.S. Pat. No. 3,934,541 to Louis May et al., entitled TRIANGULAR FOLDING REFLECTIVE TRAFFIC MARKER, which patent was assigned to the present assignee and which is incorporated herein by reference. In the May patent, a triangular marker includes a reflective base member and two reflective side members which fold to a compact storage configuration when not in use, but which interlock to make a highly visible triangle on a swivel base when deployed in use. The May device was designed for placement on the ground or other flat surface.

A number of other motorist warning devices have been designed for attachment to a vehicle, such as an automobile. Many of these prior art devices are designed for attachment to a side window of an automobile. Examples include U.S. Pat. No. 3,672,323 to Hawes, entitled EMERGENCY SIGN ASSEMBLY; U.S. Pat. No. 3,703,152 to Morton, entitled DISTRESS SIGNALING DEVICE; U.S. Pat. No. 3,738,039 to DeFuria, entitled HIGHWAY Safety aid; U.S. Pat. No. 3,975,849 to Tuleja, entitled REFLECTING TRIANGULAR WARNING DEVICES; U.S. Pat. No. 4,348,978 to Brucato, entitled AUTA-HELP; and U.S. Pat. No. 5,195,264 to Johanson et al., entitled DISTRESS STOP WARNING INFORMATION SIGN FOR VEHICLES. Each of these patents involves a warning sign of some type, which is connected to a hook designed to overlap the top of an automobile side window. In virtually all of these patents, this window engaging hook is the only support which the warning sign and, in some cases, a rather lengthy support arm, have. This presents a problem when these devices are used in adverse weather conditions, such as storms or high wind conditions. Furthermore, the signs are designed to be placed on the road side of the vehicle for purposes of enhanced visibility, and, therefore, are exposed to the considerable wind gusts generated by passing cars and, especially, trucks and semi-trailers. This can cause the signs and supports to be bent or broken, and can subject the side window itself to considerable stress.

It is clear that a need exists for a motorist warning marker which conveniently attaches to a vehicle side window, but which is stable under conditions of high wind or gusts. Such a warning marker should be highly visible in use, yet collapsible for convenient storage, and should be economical to manufacture.

SUMMARY OF THE INVENTION

The present invention is directed to an improved auto emergency warning marker which is designed to be hung on an automobile side window in a position highly visible to passing traffic. The warning marker is preferably made of molded plastic and is collapsible, including a reflective base member and two reflective side members which fold to a compact storage configuration when not in use, but which interlock to make a highly visible triangle. The collapsing and interlocking structure is similar to that taught in U.S. Pat. No. 3,934,541 to Louis May et al., mentioned above. The base member of the warning marker has the following attachments, which are preferably integrally molded thereon: (1) a hook positioned proximate one end of the base member, which hook curves outward away from the base member to accommodate the typical curvature of modern automobile side windows. The hook is designed to fit over the top of an automobile side window which has been cranked partially open; (2) a pad holder positioned near the center of the base member, which pad holder is designed to accommodate one or more resilient pads in a position facing the automobile side window when the hook is engaged thereon to provide support for the warning marker and to protect the window surface; and (3) a pair of locking receptacles, each of which is positioned near a respective end of the base member and each of which engages a protruding locking tab on a respective one of the reflective side members. The overall design of the inventive warning marker allows it to be conveniently positioned on any automobile side window and, once in position, to be solidly anchored there even in the face of gusting wind conditions.

OBJECTS AND ADVANTAGES OF THE INVENTION

The principal objects of the present invention include: providing an improved auto emergency warning marker; providing such a warning marker which is collapsible to a convenient storage configuration, yet interlocks in a rigid deployed triangle shape; providing such an improved warning marker which includes a pair of highly reflective side members hingedly attached to respective opposing ends of a highly reflective base member; providing such a warning marker which securely attaches to any automobile side window in a highly visible position to passing traffic; providing such a warning marker which is very stable, even in the face of gusting winds, when positioned on an automobile side window; providing such a warning marker which is preferably made of molded plastic; providing such a warning marker in which an attachment hook and pad holder are integrally molded into the marker base member; and providing such a warning marker which is economical to manufacture and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a side elevational view of the warning marker of FIG. 1, showing the base member with integrally molded hook, pad and pad holder, and tab and interlocking receptacles.

FIG. 4 is a fragmentary, perspective view of a portion of the warning marker of FIG. 1, again illustrating the integral window engaging hook and pad and pad holder.

FIG. 5 is a cross sectional view, taken along line 5—5 of FIG. 4, and illustrating the integrally molded nature of the window engaging hook.

DETAILED DESCRIPTION OF THE INVENTION

Figure 1:
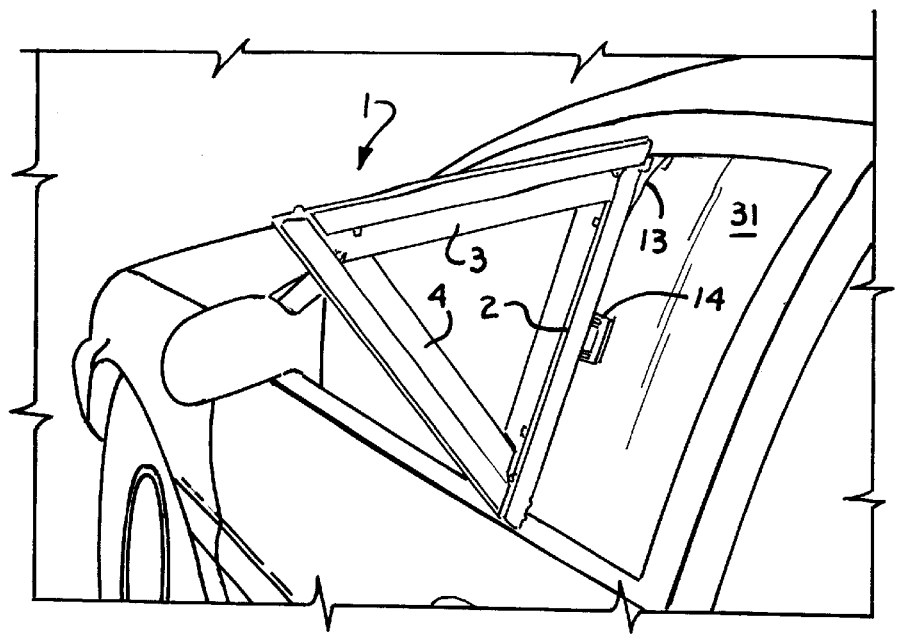
FIG. 1 is a perspective view of an improved auto safety warning marker in accordance with the present invention, shown positioned on an automobile side window.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIGS. 1–5 an improved auto safety warning marker is illustrated and generally indicated at 1. The warning marker 1 includes a marker frame made up of a base member 2 with a pair of side members 3 and 4, each of which is hingedly attached to the base member 2 near respective opposing ends thereof via respective pivot pins 5. Each of the side members 3 and 4 and the base member 2 includes an elongate, highly reflective insert 6 attached to and positioned on either side thereof. The side members 3 and 4 pivot outward from the base member 2 and overlap and interlock via tabs 11 engaging with slots 12 to form the triangle shape illustrated in the drawings. By withdrawing the tabs 11 from the slots 12 and folding the side members 3 and 4 toward the base member 2, the marker 1 can be collapsed to a convenient storage configuration (not shown) as is illustrated in the May et al. U.S. Pat. No. 3,934,541.

The warning marker base member 2 includes a window engaging hook 13 which is integrally molded therein, as is illustrated in FIG. 5. This adds strength and lowers the cost of manufacture as compared to separate components. Similarly, a pad holder 14 is also preferably integrally molded into the base member 2 and a resilient pad 15 is mounted on the pad holder 14. The pad holder 14 is shown positioned near the center of the base member 2, but it can be positioned anywhere along the base member 2 as long as it is spaced away from the hook 13 a distance sufficient to allow a stable footing on a side window.

As best seen in FIGS. 3 and 4, a pair of receptacles 21 and 22 are also preferably integrally molded into the base member 2 and are positioned to receive a respective one of a pair of tabs 23, with each tab 23 protruding outward from a terminal end of a respective one of the side members 3 and 4. Each of the receptacles 21 and 22 includes a central channel 24 which engages the respective tab 23 to prevent the side member 3 or 4 from being pivoted outward beyond the angle needed to overlap and interlock the side members 3 and 4. The engagement of tabs 23 with receptacles 21 and 22 provide added rigidity and stability to the deployed warning marker 1.

Figure 2:
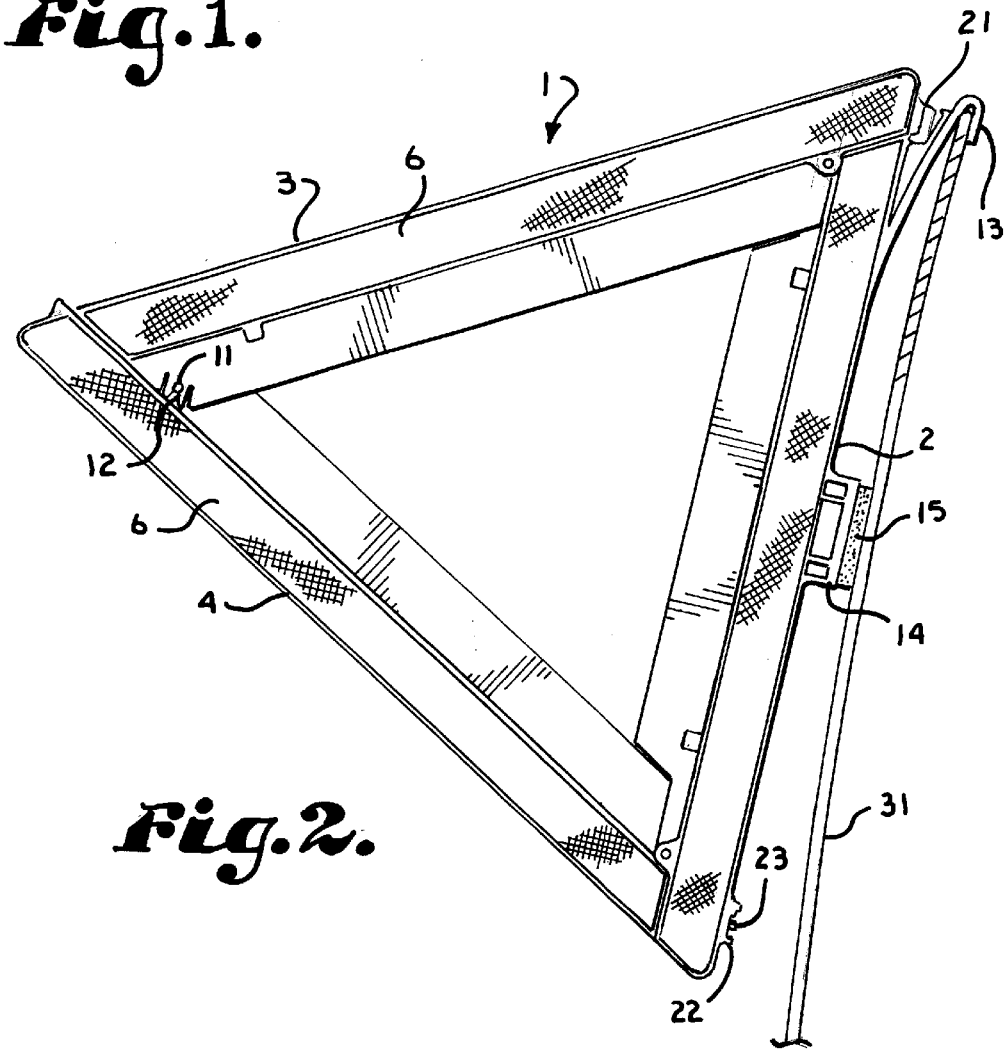
FIG. 2 is an enlarged, rear elevational view of the warning marker of FIG. 1, also shown attached to the automobile side window.

In operation, as is best illustrated in FIGS. 1 and 2, after the warning marker 1 has been interlocked into its triangle configuration, an automobile side window 31 is lowered somewhat so that the hook 13 can engage the top of the window 31, as is shown in FIG. 2. The hook 13 extends outward away from the base member 2 a considerably distance which allows for the curvature of a typical automobile side window, such as the window 31. When the hook 13 is engaged with the top of the window 31, the spacing between the hook 13 and the pad holder 14 allows the resilient pad 15 to rest on the outside of the window 31. As shown in FIGS. 3 and 4, a window engaging upper portion 32 of the hook 13, and the pad holder 14 and pad 15 are considerably wider than the base member 2, which increases the bearing surface of the hook 13 and pad 15 on the window 31 for enhanced stability, such as in gusty winds and the like. The warning marker 1, when mounted to an automobile side window, such as is shown in FIG. 1, thus presents a highly visible warning positioned such that it is easily seen by passing motorists.

While the warning marker 1 has been illustrated and described in a specific embodiment, it is not to be considered so limited. For example, the triangular shape is representative only. Other shapes, sizes and styles of warning markers could also be used without departing from the spirit of the invention. It is thus to be understood that while certain forms of the present invention have been illustrated and described herein, it is not to be limited to the specific forms or arrangement of parts described and shown.

I claim:

1. A triangular automobile warning marker removably mountable on an automobile side window having a top portion and an outside surface, said warning marker comprising:

a) a marker frame including a base member and two side members adapted to form a triangle;

b) a hook sized and shaped for overlapping and engaging the top portion of the automobile side window, said hook having a first leg attached to and extending outward from said base member at an acute angle relative to said base member and toward a first end of said base member, said hook having a second leg spaced outward from said first leg and generally directed toward a second end of said base member to form a hooked end of said hook which is positioned proximate said first end of said marker frame base member; and c) a contact member connected to and extending outward from said base member and adapted to contact an outside surface of the automobile side window to support said marker thereon when said hook is engaged with the top of the side window.

2. An automobile warning marker as in claim 1, wherein each of said side members is pivotally attached to said base member proximate a respective end thereof.

3. An automobile warning marker as in claim 1, wherein said hook is integrally molded with said base member.

4. An automobile warning marker as in claim 1, wherein a window engaging portion of said hook is substantially wider than said base member.

5. An automobile warning marker as in claim 1, and further comprising a plurality of highly reflective inserts attached to said marker.

* * * * *